(12) United States Patent
McAllister et al.

(10) Patent No.: US 12,055,434 B2
(45) Date of Patent: Aug. 6, 2024

(54) DIFFUSER FOR IRRADIANCE SENSOR INCLUDING DIFFUSER PROTRUDING FROM EXTERIOR SURFACE

(71) Applicant: MicaSense, Inc., Seattle, WA (US)

(72) Inventors: Justin Bates McAllister, Seattle, WA (US); Steven Matthew Larsen, Seattle, WA (US)

(73) Assignee: MicaSense, Inc., Seattle, WA (US)

( * ) Notice: Subject to any disclaimer, the term of this patent is extended or adjusted under 35 U.S.C. 154(b) by 0 days.

(21) Appl. No.: 17/720,093

(22) Filed: Apr. 13, 2022

(65) Prior Publication Data

US 2022/0333979 A1 Oct. 20, 2022

Related U.S. Application Data

(60) Provisional application No. 63/174,929, filed on Apr. 14, 2021.

(51) Int. Cl.
 *G01J 1/04* (2006.01)
 *G01J 1/02* (2006.01)
 (Continued)

(52) U.S. Cl.
 CPC .......... *G01J 1/0474* (2013.01); *G01J 1/0271* (2013.01); *G01J 1/0488* (2013.01); *G01J 1/4228* (2013.01);
 (Continued)

(58) Field of Classification Search
 CPC ...... G01J 1/0474; G01J 1/0488; G01J 1/4228; G01J 2001/448; G01J 3/0205;
 (Continued)

(56) References Cited

U.S. PATENT DOCUMENTS

| 5,010,244 A | 4/1991 | Nissborg |
| 6,396,040 B1 * | 5/2002 | Hill ........................ G01J 1/42 |
| | | 250/226 |

(Continued)

FOREIGN PATENT DOCUMENTS

| CN | 101750068 A | 6/2010 |
| CN | 104006879 A | 8/2014 |

(Continued)

OTHER PUBLICATIONS

Pulli, "Improved Diffusers for Solar UV Spectroradiometers," AALTO University, School of Electrical Engineering, Thesis submitted for examination for the degree of Master of Science in Technology, Oct. 26, 2012. (57 pages).

(Continued)

*Primary Examiner* — Jennifer D Bennett
*Assistant Examiner* — Erin R Garber
(74) *Attorney, Agent, or Firm* — Seed IP Law Group LLP

(57) ABSTRACT

The present disclosure is directed to irradiance sensing devices and methods. One such device includes a housing and an optical diffuser coupled to the housing. The housing has an opening that extends into the housing from an outer surface, and the opening has a circular shape at the outer surface of the housing. The optical diffuser has a first region that extends at least partially beyond the outer surface of the housing and a second region housed within the housing. The first region of the optical diffuser has a curved surface, and the optical diffuser includes a cavity extending at least partially into the second region.

22 Claims, 5 Drawing Sheets

(51) Int. Cl.
*G01J 1/42* (2006.01)
*G01J 3/02* (2006.01)
*G01J 3/28* (2006.01)
*G02B 1/04* (2006.01)
*G01J 1/44* (2006.01)

(52) U.S. Cl.
CPC ........... *G01J 3/0205* (2013.01); *G01J 3/0291* (2013.01); *G01J 3/2823* (2013.01); *G02B 1/04* (2013.01); *G01J 2001/448* (2013.01); *G01J 2003/2826* (2013.01)

(58) Field of Classification Search
CPC ............ G01J 3/0291; G01J 2001/4266; G01J 2003/2826; G01J 1/0266; G01J 1/0271; G01J 3/0289; G01J 3/2823; G01J 3/0208; G01J 3/2803; G01J 3/0256; G01J 3/36; G01J 3/513; G01J 2003/1213; G01J 1/0411; G01J 5/0846; G02B 1/04; G02B 6/0051; G02B 6/0021
See application file for complete search history.

(56) References Cited

U.S. PATENT DOCUMENTS

| | | |
|---|---|---|
| 6,417,500 B1 | 7/2002 | Wood |
| 7,664,225 B2 | 2/2010 | Klein |
| 9,415,870 B1 | 8/2016 | Beckman et al. |
| 9,470,579 B2 | 10/2016 | Ritter et al. |
| 11,290,623 B2 | 3/2022 | Darvas |
| 2006/0006332 A1* | 1/2006 | Dragoi ................. G01N 21/274 250/336.1 |
| 2012/0200703 A1 | 8/2012 | Nadir et al. |
| 2013/0126706 A1 | 5/2013 | Lynass et al. |
| 2013/0152998 A1 | 6/2013 | Herzig et al. |
| 2013/0266221 A1 | 10/2013 | Kaneko |
| 2014/0022381 A1 | 1/2014 | Heinold |
| 2014/0118526 A1 | 5/2014 | Sutton et al. |
| 2014/0267596 A1 | 9/2014 | Geerds |
| 2015/0367957 A1 | 12/2015 | Uskert et al. |
| 2016/0069741 A1 | 3/2016 | Ritter et al. |
| 2016/0232650 A1 | 8/2016 | Christ et al. |
| 2016/0237745 A1 | 8/2016 | Wen et al. |
| 2017/0276542 A1 | 9/2017 | Klawuhn et al. |
| 2018/0027152 A1 | 1/2018 | Sheridan |
| 2018/0143130 A1 | 5/2018 | Shearer et al. |
| 2018/0343367 A1* | 11/2018 | Darvas ................... G01S 3/784 |
| 2019/0154498 A1 | 5/2019 | Mehrl et al. |
| 2020/0132549 A1* | 4/2020 | Hromin .................. G01J 3/513 |
| 2021/0164831 A1* | 6/2021 | Eilmsteiner ........... G01J 1/0492 |
| 2021/0183922 A1* | 6/2021 | Chou ................ H01L 27/14685 |

FOREIGN PATENT DOCUMENTS

| | | |
|---|---|---|
| CN | 204037916 U | 12/2014 |
| CN | 105890748 A | 8/2016 |
| EP | 1012633 A1 | 6/2000 |
| JP | S5138137 A | 3/1976 |
| JP | S5910806 A | 1/1984 |
| JP | S6273108 A | 4/1987 |
| JP | H0352208 U | 5/1991 |
| JP | 2009210280 A | 9/2009 |
| TW | 201140005 A | 11/2011 |
| WO | 2016040316 A1 | 3/2016 |

OTHER PUBLICATIONS

Pulli et al., "A method for optimizing the cosine response of solar UV diffusers," *Journal of Geophysical Research: Atmospheres* 118:7897-7904, Jul. 26, 2013.

Schenato et al., "Attitude Control for a Micromechanical Flying Insect via Sensor Output Feedback," *IEEE Transactions on Robotics and Automation* 20(1):93-105, Feb. 2004.

Hämäläinen et al., "A Multisensor Pyranometer for Determination of the Direct Component and Angular Distribution of Solar Radiation," *Solar Energy* 35(6):511-525, 1985.

Okayasu et al., "Utilization of Drone to Evaluate Growth Characteristics of Open Cultivation Crops," Journal of Agriculture and Food Engineering Society) vol. 78 No. 2 (Mar. 2016) p. 110-115.

\* cited by examiner

DIFFUSER FOR IRRADIANCE SENSOR INCLUDING DIFFUSER PROTRUDING FROM EXTERIOR SURFACE

BACKGROUND

Technical Field

The present disclosure is directed to optical diffusers for an irradiance sensor.

Description of the Related Art

An optical diffuser or light diffuser may generally be made of any material that diffuses or scatters light in some manner to transmit soft light. Conventional diffusers are often made of a translucent material, such as ground glass, opal glass, greyed glass, or a diffuse plastic.

BRIEF SUMMARY

The present disclosure is directed to optical diffusers, and more particularly to irradiance sensing devices and methods including an optical diffuser. The diffuser includes a generally spherical portion that extends at least partially outwardly beyond an outer surface of a housing of the irradiance sensing device. The diffuser may include another portion that is cylindrical in shape and that includes a cavity. The cavity may be filled with air. In use, light is received at the spherical portion of the diffuser and is diffused and transmitted through a radial thickness of the diffuser and into the cavity. Inner surfaces of the diffuser (e.g., at the boundary of the cavity) are highly reflective and thus the light is confined within the cavity until it exits through an open portion of the cavity. The open portion of the cavity may be overlying or aligned with a photo sensor, so the light that exits the cavity may be sensed by the photo sensor. In some embodiments, the irradiance sensing device may be utilized on a drone or aerial vehicle, for example, for sensing the irradiance from a light source, such as the sun.

In at least one embodiment, the present disclosure provides an irradiance sensing device that includes a housing and an optical diffuser coupled to the housing. The housing has an opening that extends into the housing from an outer surface, and the opening has a circular shape at the outer surface of the housing. The optical diffuser has a first region that extends at least partially beyond the outer surface of the housing and a second region housed within the housing. The first region of the optical diffuser has a curved surface, and the optical diffuser includes a cavity extending at least partially into the second region.

In at least one embodiment, the present disclosure provides an irradiance sensing device that includes a housing and a plurality of first optical diffusers. The housing has an upper surface and a plurality of inclined surfaces that are inclined with respect to the upper surface. The plurality of inclined surfaces have different orientations with respect to one another. The first optical diffusers are at least partially housed within the housing. Each of the first optical diffusers has a first region including a curved surface extending outwardly at least partially beyond a respective one of the plurality of inclined surfaces, and a second region housed within the housing. Each of the first optical diffusers includes a cavity extending at least partially into the second region.

In at least one embodiment, the present disclosure provides a method that includes: positioning an optical diffuser within an opening of a housing, the opening having a circular shape at an outer surface of the housing, the optical diffuser having a having a first region including a curved surface that extends at least partially beyond the outer surface of the housing, a second region disposed within the opening of the housing, and a cavity extending into the second region; positioning an optical filter on the second region of the optical diffuser; and securing the optical filter and the optical diffuser in the opening of the housing.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

The present disclosure is directed to an optical diffuser, and to devices and methods for measuring solar irradiance that include an optical diffuser. Irradiance from a light source, such as the sun, may be simultaneously sensed by a plurality of photo sensors arranged at differing orientations on an irradiance sensing device. The optical diffuser has a curved surface exposed at an exterior of a housing of the irradiance sensing device, and a generally cylindrical portion that extends from the exposed curved surface into an interior of the housing.

Figure 1:
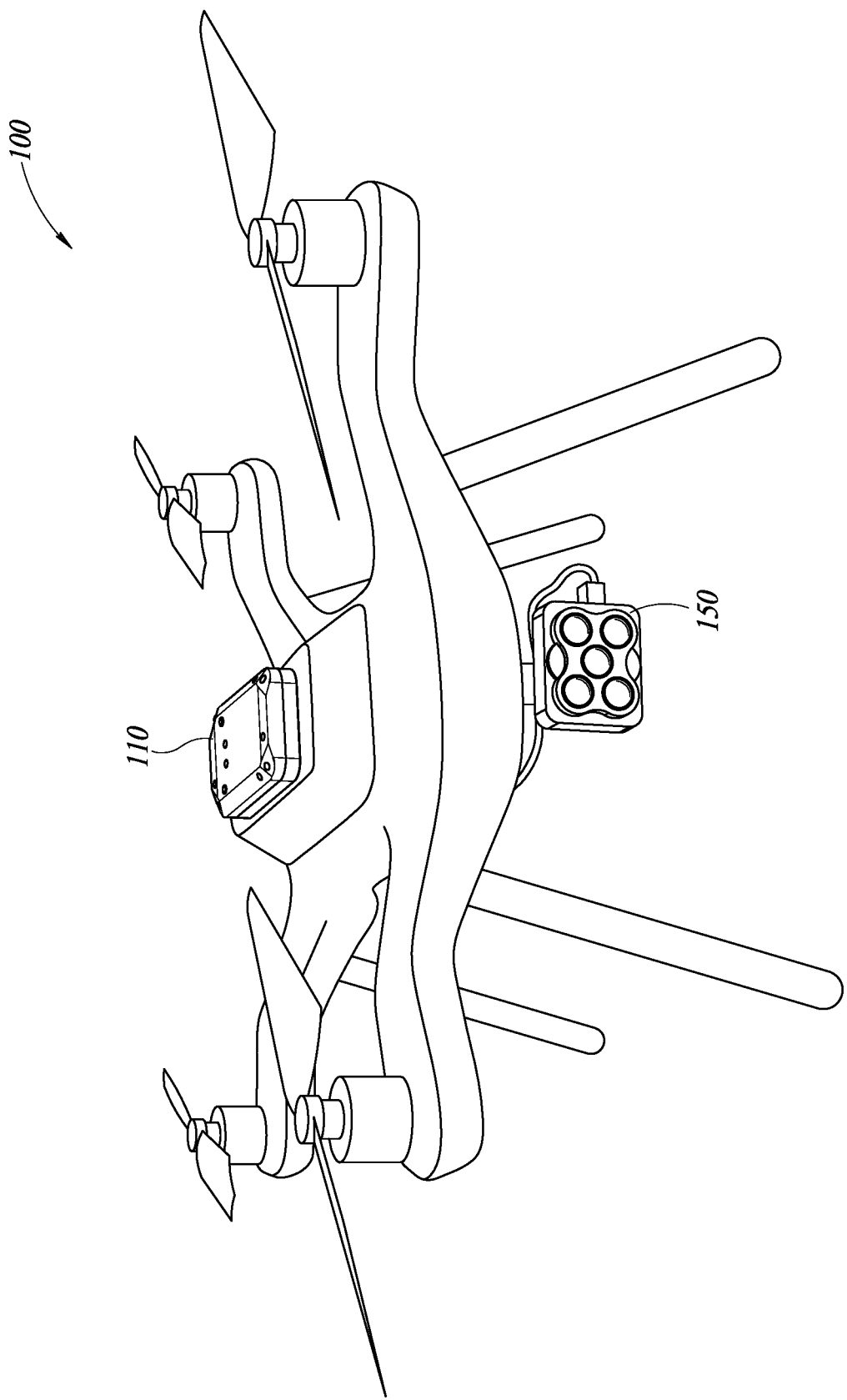
FIG. 1 is an illustration of an aerial vehicle for sensing irradiance and simultaneously obtaining an image of a target, in accordance with one or more embodiments of the present disclosure.

FIG. 1 illustrates an aerial vehicle 100 including an irradiance sensor 110. In some embodiments, the irradiance sensor 110 may be mounted on the aerial vehicle 110. For example, the irradiance sensor 110 may be mounted on an upper exterior surface of the aerial vehicle 110 so that the irradiance sensor is oriented to receive and sense solar irradiance during a flight of the aerial vehicle 110. In some embodiments, the aerial vehicle 100 may be utilized for sensing irradiance and simultaneously obtaining an image, for example, of a ground-based target.

A shown in FIG. 1, the aerial vehicle 100 may further include an imaging device 150 for imaging a physical area or scene (i.e., a target). The irradiance sensing device 110 and the imaging device 150 may collect, store and output the obtained irradiance and image information.

The aerial vehicle 100 may be any type of aerial vehicle, including any rotary or fixed wing aerial vehicle, and may be an unmanned vehicle (as shown in FIG. 1) or manned aerial vehicle, such as an airplane or a drone. Additionally, the aerial vehicle 100 may be an autonomous vehicle, capable of autonomous flight, and in some embodiments may be capable of autonomous acquisition of irradiance and image information. In other embodiments, the aerial vehicle 100 may be a piloted vehicle, e.g., flown by a pilot in a manned vehicle, or by a remote pilot of an unmanned vehicle.

The imaged target (e.g., trees, crops, a body of water or the like) receives irradiance from a light source, such as the sun. The target may be one or more distinct objects (e.g., a single tree, a building, a pond, etc.), an area or scene (e.g., a portion of a forest, a portion of a field of crops, a portion of a lake, etc.) or any other target for which the acquisition of an image may be desired.

The imaging device 150 may be a multispectral imaging device capable of acquiring spectral images of a target, and may include multiple imagers, with each such imager being tuned for capturing particular wavelengths of light that is reflected by the target. The imaging device 150 may be configured to capture reflected light in one or more of the ultraviolet, visible, near-infrared, or infrared regions of the electromagnetic spectrum.

Images acquired by such multispectral imaging devices may be utilized to measure or determine different characteristics of the target, such as the chlorophyll content of a plant, an amount of leaf area per unit ground area, an amount or type of algae in a body of water, and the like. In one or more embodiments, the imaging device 150 may be used to determine the reflectance of the imaged target, as described, for example, in U.S. Patent Application Publication Number 2018/0343367, the entirety of which is incorporated by reference herein.

The imaging device 150 may be mounted to the aerial vehicle 100 and oriented in any manner as may be desired. For example, the imaging device 150 may be mounted to a lower surface of the aerial vehicle 100 and positioned such that images of ground-based targets may be obtained.

The irradiance sensing device 110 may be mounted to an upper surface of the aerial device 100, and includes a plurality of photo sensors configured to simultaneously sense irradiance from a light source, such as the sun, at various different orientations with respect to the light source.

By simultaneously sensing irradiance by multiple photo sensors having different orientations, it is possible to determine particular characteristics of the light source, such as the direct and scattered components of solar irradiance, as well as an angle of incidence a of the solar irradiance. Moreover, the irradiance sensing device 110 may sense irradiance at the same time as images are acquired by the imaging device 150, which enables normalization or compensation of the acquired images to account for variations in received irradiance by the imaged target. For example, an image of a target acquired by the imaging device 150 on a cloudy day can be correlated to an image acquired of the same target on a cloudless day, by accounting for the differences in the irradiance sensed by the irradiance sensing device 110 at the time of acquiring each image.

Figure 2:
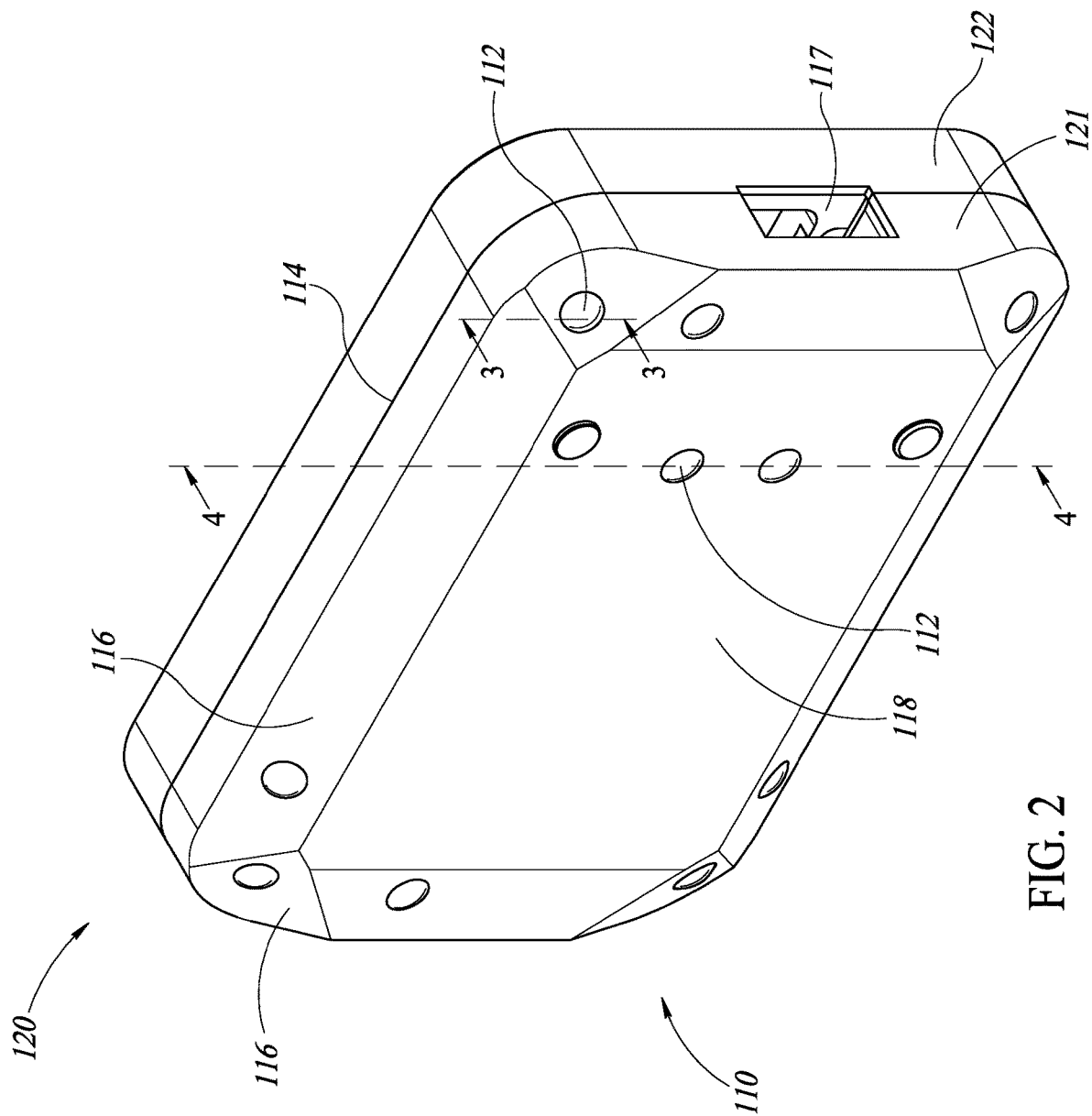
FIG. 2 is an illustration of an irradiance sensing device, in accordance with one or more embodiments of the present disclosure.

FIG. 2 illustrates the irradiance sensing device 110, in accordance with one or more embodiments of the present disclosure.

The irradiance sensing device 110 includes a plurality of irradiance sensing surfaces arranged at different orientations and photo sensors configured to receive and sense varying amounts or components (e.g., direct and scattered components) of irradiance from a light source such as the sun. The irradiance sensing device 110 can be attached to an aerial vehicle and communicatively coupled to an imaging device, such as the aerial vehicle 100 and imaging device 150 shown in and described with respect to FIG. 1.

The irradiance sensing device 110 includes a plurality of diffusers 112 arranged at various surfaces of a housing 120. An exterior of the housing 120 forms outer surfaces of the device 110. In some embodiments, the housing 120 may include two or more pieces that are securable to one another by any suitable elements, including, for example, by one or more of a fastener, adhesive material, hinges, or the like. As shown in FIG. 2, in some embodiments the housing 420 includes a top enclosure 121 and a bottom enclosure 122.

As will be described in further detail with respect to FIGS. 3 and 4, various components, circuitry, and the like may be housed within the housing 120.

The top enclosure 121 includes a plurality of inclined surfaces 116 which extend in different orientations between respective edges or lower surfaces 114 and an upper surface 118 of the top enclosure 121. As shown in FIG. 2, in some embodiments, the top enclosure 121 includes eight inclined surfaces 116 and one upper surface 118, each of which may be considered as an irradiance sensing surface of the irradiance sensing device 110.

Each of the diffusers 112 is positioned within a respective opening that extends through one of the inclined surfaces 116 or the upper surface 118. In some embodiments, each of the inclined surfaces 116 and the upper surface 118 includes at least one diffuser 112 positioned within a respective opening. The diffusers 112 may be oriented to receive and sense varying amounts or components (e.g., direct and scattered components) of irradiance from a light source such as the sun.

The diffusers 112 have a curved surface that is exposed at the exterior of the housing 120 of the irradiance sensing device 110. For example, the exposed curved surface may have generally spherical shape, such as a spherical cap or spherical dome shape that protrudes at least partially beyond the exterior surface of the housing 120.

The housing 120 may have any shape or form that includes a plurality of surfaces on which the diffusers 112 may be mounted and configured to sense irradiance, for example, from a plurality of differing orientations. In various embodiments, the irradiance sensing device 110 may include at least four diffusers 112, and in some embodiments may include five or more diffusers 112 at least partially exposed to the external environment.

In some embodiments, each of the diffusers 112 is associated with a respective photo sensor that is housed within the housing 120, as will be described in further detail later herein. For example, each of the diffusers 112 may be configured to receive light, e.g., incident at the external surface of the irradiance sensing device 110, and to diffuse and transmit the received light to the associated photo sensor.

The irradiance sensing device 110 may include one or more ports 117 for communicating signals (e.g., one or more signals indicative of the sensed irradiance) to or from the irradiance sensing device 110. In some embodiments, the irradiance sensing device 110 may be coupled to processing circuitry (e.g., by one or more electrical wires or cables coupled to the port 117) that is included onboard the aerial vehicle 100. The processing circuitry may similarly be communicatively coupled to the imaging device 150. Accordingly, the processing circuitry may acquire the sensed irradiance by the irradiance sensing device 110 at the same time as an image of a target is acquired by the imaging device 150. The irradiance sensed by the irradiance sensing device 110 may thus be correlated with the image that is simultaneously acquired by the imaging device 150.

Additionally or alternatively, the irradiance sensing device 110 may store the sensed irradiance information as it is acquired during a flight of the aerial vehicle 100. Similarly, the imaging device 150 may store images acquired during the flight. The image and irradiance information may later be uploaded to a computing system, which may correlate the stored irradiance and image information based on the time of acquisition of such information, which may be provided through a time stamp or similar information that may be included with the irradiance and image information.

Figure 3:
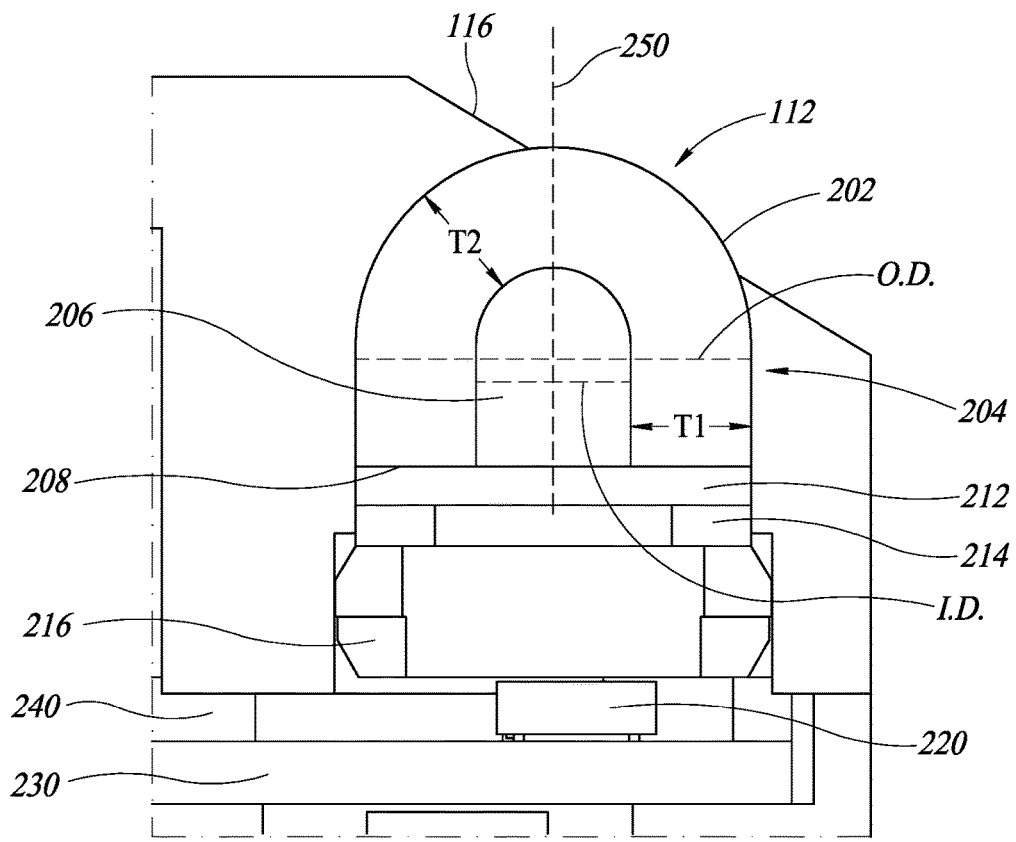
FIG. 3 is a cross-sectional view taken along the line 3-3 of the irradiance sensing device shown in FIG. 2.

FIG. 3 is a cross-sectional view taken along the line 3-3 of the irradiance sensing device 110 shown in FIG. 2.

As shown in FIG. 3, the diffuser 112 includes a first or upper region 202 and a second or lower region 204. In some embodiments, the diffuser 112 may be a single piece of material having the upper and lower regions 202, 204. The upper region 202 may have a spherical shape, such as a spherical cap or spherical dome shape, that protrudes at least partially beyond the exterior surface of the housing 120. In the example shown in FIG. 3, the diffuser 112 is arranged at an inclined surface 116 of the housing 120, and the upper region 202 of the diffuser 112 protrudes outwardly beyond the inclined surface 116. In some embodiments, diffuser 112 protrudes at least partially through a circular opening of the housing 120. The spherical shape of the upper region 202 of the diffuser 112 may completely fill the circular opening at the outer surface of the housing 120.

The diffuser 112 includes a cavity 206 that extends into a central region of the diffuser 112 from a lower surface 208 of the diffuser 112. The center of the cavity 206 may be aligned with the center of the diffuser 112 along an axis, such as a vertical axis 250. In some embodiments, the cavity 206 may have a shape that is the same or substantially the same as the shape of the diffuser 112. For example, the cavity 206 may have a spherical shape, such as a spherical cap or spherical dome shape, that corresponds to the shape of the outer surface of the diffuser 112.

The cavity 206 may be an empty cavity, or may be filled with one or more materials. In some embodiments, the cavity 206 is filled with air.

The diffuser 112 has an inner diameter I.D. and an outer diameter O.D. The inner diameter I.D. is the diameter of the inside of the diffuser 112, i.e., the diameter of the cavity 206. The outer diameter O.D. is the diameter of the outer surface of the diffuser 112, e.g., the diameter of the outer surface of the lower region 204 of the diffuser 112. In some embodiments, the diffuser has an outer diameter I.D. within a range from about 3 mm to about 7 mm, and an inner diameter I.D. within a range from about 0.5 mm to about 4 mm.

In some embodiments, the diffuser 112 has a uniform or substantially uniform radial thickness. For example, as shown in FIG. 3, the radial thickness T1 at the lower region 204 is the same or substantially the same as the radial thickness T2 at the upper region 202. In some embodiments, the radial thickness of the diffuser 112 is within a range from about 0.5 mm to about 3 mm.

In at least one embodiment, the diffuser 112 has an outer diameter O.D. equal or substantially equal to 5 mm, an inner diameter I.D. equal or substantially equal to 2 mm, and a radial thickness equal or substantially equal to 1.5 mm.

In at least one embodiment, the diffuser 112 has an outer diameter O.D. equal or substantially equal to 4 mm, an inner diameter I.D. equal or substantially equal to 1 mm, and a radial thickness equal or substantially equal to 1.5 mm.

These dimensions provide a good balance of diffused light and transmission of light through the diffuser 112. In particular, incident light travels through the radial thickness of the diffuser 112 which is selected to cause a desired balance between the amount of diffusion of the light and the transmission of the light through the diffuser 112 and into the cavity 206.

Each of the diffusers 112 is associated with a respective photo sensor 220 that is housed within the housing 120. As shown in FIG. 3, the photo sensor 220 may be arranged on a circuit board, such as a printed circuit board (PCB) 230. The photo sensors 220 may be mounted on the PCB 230 in locations that correspond with locations of the diffusers 112. For example, as shown in FIG. 3, the cavity 206 of the diffuser 112 may be disposed at least partially overlying the photo sensor 220. In some embodiments, a photo sensing surface the photo sensor 220 is aligned with the cavity 206, such as aligned with the cavity 206 along the vertical axis 250.

In some embodiments, an optical filter 212 is disposed between the diffuser 112 and the photo sensor 220. In various embodiments, the optical filter 212 may be any of a band-pass filter, a band-stop filter, a high-pass filter, or a low-pass filter. In some embodiments, the optical filter 212 may be an infrared (IR) blocking filter configured to block infrared light and to pass only non-infrared light (e.g., visible light) to the photo sensor 220. In some embodiments, only the diffusers 112 that are disposed along the inclined surfaces 116 of the housing 120 are associated with a corresponding optical filter 212. For example, as shown in FIG. 4, in some embodiments optical filters may be omitted from the light path between the diffusers 112 at the upper surface 118 of the housing 120 and corresponding photo sensors.

The diffuser 112 and optical filter 212 may be secured within the housing 120 (e.g., within an opening or bore in the housing 120) by any suitable fastener or securing assembly. In some embodiments, the diffuser 112 and optical filter 212 are securely positioned within the opening of the housing 120 by a washer 214 and a lock ring 216. The washer 214 may be disposed between the lock ring 216 and the optical filter 212. In some embodiments an inner surface of the opening or bore of the housing 120 may be threaded, for example, and the lock ring 216 may have threads that engage with the threads of the housing 120 in order to securely hold the optical filter 212 and the diffuser 112 within the opening of the housing 120. In some embodiments, no adhesives or glues are included to secure the optical filter 212 and the diffuser 112 within the housing 120.

The irradiance sensing device 110 may include a gasket 240 on the PCB 230. The gasket 240 may be disposed between the PCB 230 and the lock ring 216, as shown in FIG. 3. In some embodiments, the gasket 240 has one or more openings which house the photo sensors 220. The gasket 240 may be disposed between the PCB 230 and the top enclosure 121 of the housing 120. In some embodiments, the gasket 240 is made of an opaque material and is configured to seal or otherwise confine light within the assembly or channel including the diffuser 112 and the photo sensor 220 so that light received by one diffuser 112 is passed to only the associated photo sensor 220 and is prevented from being transmitted to a photo sensor associated with a different diffuser.

In some embodiments, each of the optical filters 212 is spaced apart from the associated photo sensor 220 by a same distance or height.

The inner surface of the diffuser 112, which defines the cavity 206, may be a highly reflective surface. In operation, the diffuser 112 thus acts as a pseudo-integrating sphere, as received light travels into the exposed upper region 202, then travels through the radial thickness of the diffuser 112 and passes through the inner surface of the diffuser 112 and into the air within the cavity 206. The light is then reflected within the cavity 206 by the inner surface of the diffuser 112 and is thus substantially confined or trapped within the cavity 206 until the light exits the cavity 206, e.g., at an opening at the lower edge of the cavity 206. The light that exits the cavity 206 is thus directed toward the photo sensor 220, which detects or senses the received light. For example, each of the diffusers 112 may be configured to receive light, e.g., incident at the external surface of the irradiance sensing device 110, and to diffuse and transmit the received light to the associated photo sensor.

The diffuser 112 may be made of any material suitable to diffuse and transmit received light, and in some embodiments, the diffuser 112 is formed of polytetrafluoroethylene (PTFE), or Teflon. The use of PTFE or Teflon for the diffusers provides several advantages over prior techniques. For example, as opposed to opal glass or other conventional diffuser materials, the optical diffusers of the present disclosure made of PTFE or Teflon are lighter in weight, more readily shapeable, and is more durable than traditional diffuser materials.

In some embodiments, the lower region 204 and the upper region 202 of the optical diffuser 212 are integrally formed of a same piece of material. In other embodiments, the lower region 204 and the upper region 202 may be separate structures that are attached to one another. In various embodiments, the upper and lower regions 202, 204 of the optical diffuser 212 may be formed of a same material or a different material.

In some embodiments, the diffusers 112 are cosine-corrected diffusers. The cosine corrected diffusers allow for light to be collected from up to a 180° angle with the diffuser surface. In some embodiments, the diffusers 112 are cosine-corrected due to the spherical shape which receives light at the exposed portions of the diffusers. Due to the shape and dimensions of the diffusers 112, the diffusers 112 are both relative easy to make and work across various different optical channels with different top-face angles relative to the sensing plane. For example, the spherical shape of the upper region 202 of the diffuser 112 may protrude outwardly beyond the circular opening at the outer surface of the housing 120. This geometrical arrangement of the spherical portion of the diffuser 112 and the circular opening of the housing 120 ensures that the diffuser 112 is radially symmetric regardless of the direction or angle of received light.

Moreover, the shape of the optical diffuser 112 and the circular opening at the outer surface of the housing 120 enables cosine corrected measurement of irradiance received at various different planes (e.g., at various differently oriented outer surfaces of the housing 120) using the same diffuser structure. For example, as shown in FIG. 3, the diffuser 112 and an associated photo sensor 220 may be vertically aligned with one another (e.g., along the vertical axis 250) even though the opening at the outer surface of the housing 120 is at an inclined angle (and is not vertically aligned with the vertical axis 250). Accordingly, the optical diffuser 112 may have a same orientation (e.g., vertical orientation as shown) irrespective of an orientation of the outer surface of the housing 120. As such, all of the photo sensors 220 may be arranged on the PCB 230 in a same orientation (e.g., with a sensing surface facing directly upward) and the optical diffusers 112 may be arranged overlying the photo sensors 220 in a same manner regardless of the geometry of the various different surfaces of the housing 120 from which the optical diffusers 112 protrude to sense irradiance.

Figure 4:
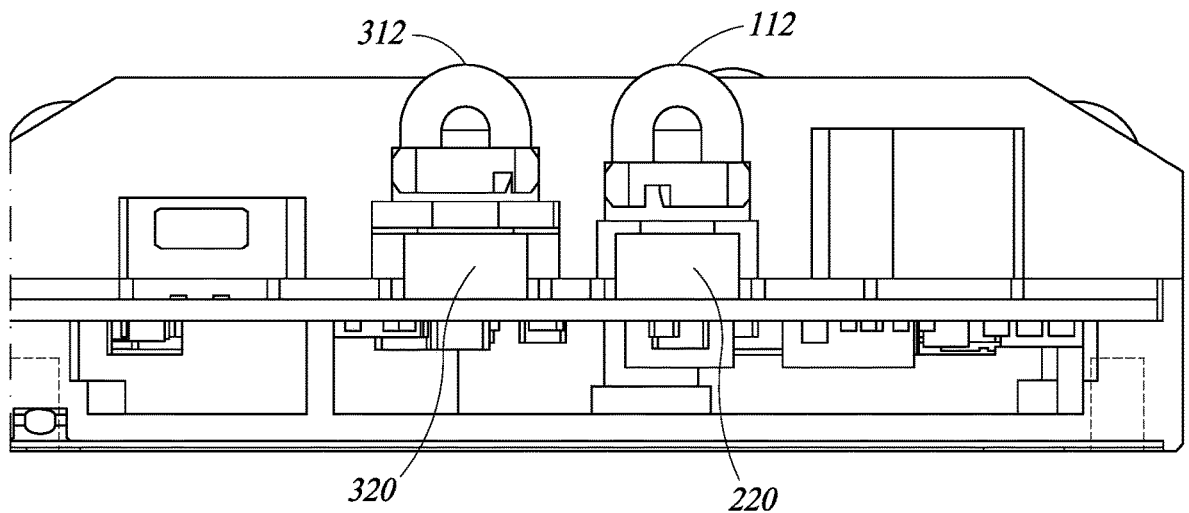
FIG. 4 is a cross-sectional view taken along the line 4-4 of the irradiance sensing device shown in FIG. 2.

FIG. 4 is a cross-sectional view taken along the line 4-4 of the irradiance sensing device 110 shown in FIG. 2. In particular, FIG. 4 illustrates diffusers 112, 312 that are arranged at the upper surface 118 of the housing 120 and corresponding photo sensors 220. Many of the features of the structure shown in FIG. 4 are the same or substantially the same as previously described herein with respect to FIG. 3. Accordingly, description of the features and functionalities that are the same as previously discussed will not be described again with respect to FIG. 4 in the interest of brevity. Instead, the following description with respect to the structure shown in FIG. 4 will focus on the differences with respect to the structure of FIG. 3.

One difference between the structure shown in FIGS. 3 and 4 is that each of the diffusers 112, 312 of FIG. 4 is arranged at the upper surface 118 of the housing 120 and is associated with a respective photo sensor 220, 320 without the presence of any optical filter.

Each of the photo sensors 220, 230 may be a multi-spectral photo sensor. The diffuser 112 shown in FIG. 4 may be the same or substantially the same as the diffuser 112 shown and described with respect to FIG. 3. For example, the diffuser 112 on the upper surface 118 may have the same shape and dimensions as the diffusers 112 located at the inclined surfaces 116 of the irradiance sensing device 110.

As shown in FIG. 4, the diffuser 112 may be associated with a photo sensor 220 that is the same or substantially the same as the photo sensor 220 shown and described with respect to FIG. 3. The photo sensor 220 may be a visible light sensor. Although the optical filter is shown as being omitted between the diffuser 112 and photo sensor 220 in FIG. 4, in some embodiments an optical filter may be included between the diffuser 112 and the photo sensor 220. For example, as shown and described previously with respect to FIG. 3, in some embodiments an optical filter (e.g., an IR blocking filter) may be included between the diffuser 112 and the photo sensor 220 shown in FIG. 4. In some embodiments, the optical filter may be the same or different than the optical filter 212 previously described with respect to FIG. 3. For example, the diffuser 112 located at the upper surface 118 of the housing 120 may be associated or aligned with an optical filter having different IR blocking properties (e.g., which blocks a different spectrum of IR light) than the optical filters 212 that are associated or aligned with the diffusers 112 located at the inclined surfaces 116 of the housing 120.

Another diffuser 312 may be arranged laterally adjacent to the diffuser 112, as shown in FIG. 4. The diffuser 312 may have different dimensions than the diffusers 112. The diffuser 312 may be associated or aligned with a photo sensor 320 that is configured to sense a different spectrum of light than the photo sensors 220 previously described herein. For example, the photo sensor 320 may be configured to sense light in a near IR spectrum, while the photo sensors 220 may be configured to sense light in the visible spectrum. Accordingly, the different size or dimensions of the diffuser 312 may be selected to advantageously diffuse and transmit light of the desired spectrum (e.g., near IR light) to the photo sensor 320.

In some embodiments, the diffuser 312 may have an outer diameter within a range from about 4 mm to about 6 mm, an inner diameter within a range from about 0.5 mm to about 1 mm, and a radial thickness within a range from about 2 mm to about 2.5 mm.

In at least one embodiment, the diffuser 312 has an outer diameter O.D. equal or substantially equal to 5 mm, an inner diameter I.D. equal or substantially equal to 0.75 mm, and a radial thickness equal or substantially equal to 2.125 mm.

In some embodiments, the radial thickness of the diffuser 312 is greater than the radial thickness of the diffusers 112. The diffuser 312 has a greater radial thickness than the diffusers 112, in some embodiments, because the photo sensor 320 is configured to sense light in a different range or spectrum (e.g., near IR light) than the photo sensors 220. In particular, the optical material of the diffusers 112, 312, such as PTFE or Teflon, may transmit near IR light, and thus the increased radial thickness of the diffuser 312 advantageously reduces the near IR transmission that is transmitted to the photo sensor 320 to within a suitable range or intensity of light. This prevents saturation of the photo sensor 320 and provides an improved signal to noise ratio by the photo sensor 320.

Figure 5:
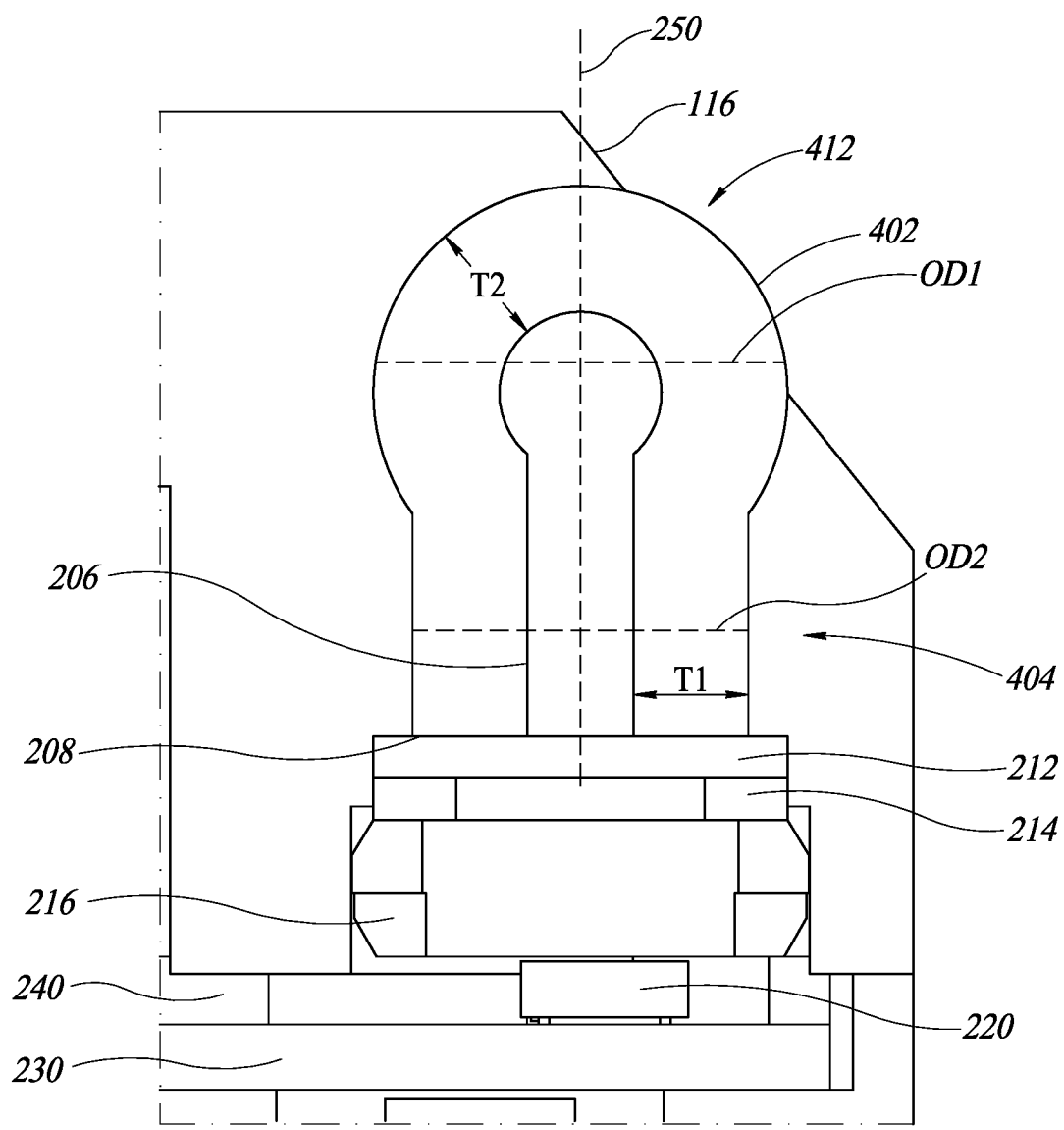
FIG. 5 is a cross-sectional view showing an optical diffuser that may be utilized in an irradiance sensing device, in accordance with one or more embodiments of the present disclosure.

FIG. 5 is a cross-sectional view illustrating an optical diffuser 412 which may be included in an irradiance sensing device in accordance with one or more embodiments. The structure illustrated in FIG. 5 is substantially the same as shown in FIG. 3, except for the differences that will be discussed below. The features shared by the structures illustrated in FIGS. 3 and 5 will not be described herein again in the interest of brevity.

Figure 6:
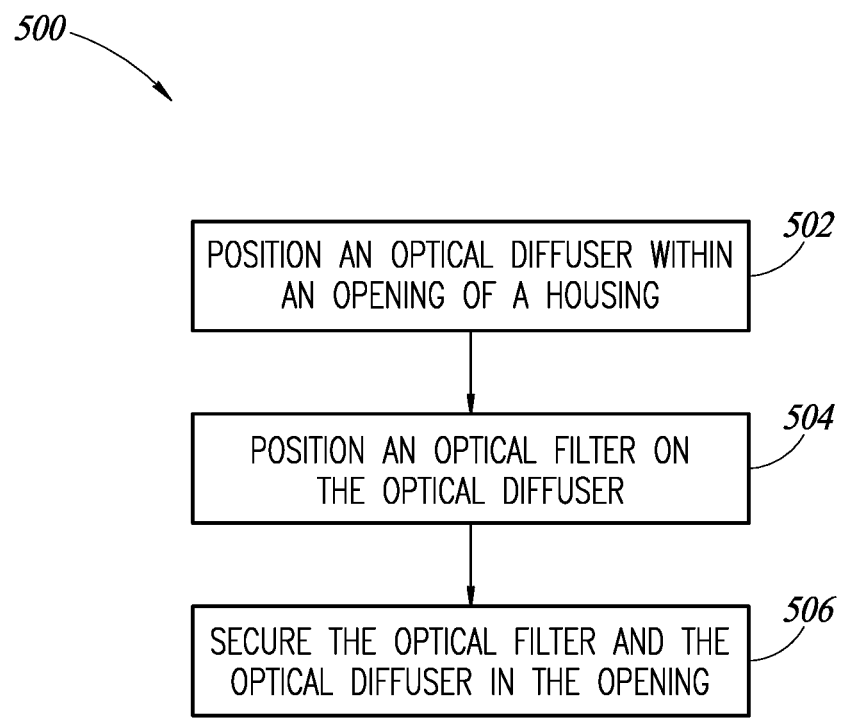
FIG. 6 is a flowchart illustrating a method, in accordance with one or more embodiments of the present disclosure.

The main difference between the structures illustrated in FIGS. 3 and 6 is that the optical diffuser 412 of FIG. 5 is different than the optical diffuser 212 shown in FIG. 3. More particularly, the optical diffuser 412 includes an upper region 402 that has an outer diameter OD1 that is greater than the outer diameter OD2 of the lower region 404. The upper region 402 has a spherical shape, such as a spherical cap or spherical dome shape, that protrudes at least partially beyond the exterior surface of the housing.

The larger size of the spherical-shaped upper region 402 relative to the lower region 404 enables greater inclined angles at various surfaces of the housing 120. For example, the inclined surface 116 may have an angle that is greater than 45° with respect to a horizontal plane, such as the upper surface of the housing 120, and the exposed portions which protrude outwardly through the opening of the housing are spherical portions of the upper region 402 of the diffuser 412. As such, the diffuser 412 has a spherical-shaped and symmetrical surface that extends outwardly beyond the housing 120 and receives incident light.

In some embodiments, the lower region 404 has a cylindrical shape. In some embodiments, the lower region 404 and the upper region 402 of the optical diffuser 412 are integrally formed of a same piece of material. In other embodiments, the lower region 404 and the upper region 402 may be separate structures that are attached to one another. For example, the lower region 404 may be directly joined or fused to the upper region 402, and in some embodiments, the lower region 404 and upper region 402 may be attached, for example, by an adhesive material.

In various embodiments, the upper and lower regions 402, 404 of the optical diffuser 412 may be formed of a same material or a different material.

In some embodiments, the lower region 404 has a radial thickness T1 that is substantially uniform, and the upper region 402 has a radial thickness T2 that is substantially uniform. The radial thickness T1 of the lower region 404 may be less than the radial thickness T2 of the upper region 402.

As shown in FIG. 5, in some embodiments, the cavity 206 may extend through the lower region 404 and partially into the upper region 402. However, in some embodiments, the cavity 206 may extend through only the lower region 404. For example, in some embodiments, the upper region 402 may be a substantially solid piece of material and the cavity 206 may extend through the central region of the lower region 404 and may terminate at a lower surface of the upper region 402 of the optical diffuser 412.

FIG. 6 is a flowchart 500 illustrating a method of the present disclosure. At 502, the method includes positioning an optical diffuser within an opening of a housing 120. The optical diffuser may be, for example, the optical diffuser 112 previously described herein. The optical diffuser 112 may be positioned, for example, in an opening that extends through an inclined surface 116 of the housing 120. In some embodiments, the optical diffuser includes a first region 202 that includes a curved surface that extends at least partially beyond an outer surface of the housing 120, and a second region 204 that is disposed within the opening of the housing. The optical diffuser may further include a cavity 206 that extends into the second region 204.

At 504, the method includes positioning an optical filter on the optical diffuser. The optical filter may be, for example, the optical filter 212 previously described herein. In some embodiments, the optical filter 212 is positioned directly on and in contact with the second region 204 of the optical diffuser (e.g., covering a lower surface of the optical diffuser) and may cover the cavity 206.

At 506, the method includes securing the optical filter and the optical diffuser in the opening. The optical filter and optical diffuser may be secured within the opening by any suitable fastener or securing assembly. In some embodiments, the diffuser 112 and optical filter 212 are secured within the opening of the housing 120 by a washer 214 and a lock ring 216. The washer 214 may be disposed between the lock ring 216 and the optical filter 212. In some embodiments an inner surface of the opening or bore of the housing 120 may be threaded, for example, and the lock ring 216 may have threads that engage with the threads of the housing 120 in order to securely hold the optical filter 212 and the diffuser 112 within the opening of the housing 120. In some embodiments, no adhesives or glues are included to secure the optical filter 212 and the diffuser 112 within the housing 120.

In the description, certain specific details are set forth in order to provide a thorough understanding of various embodiments of the disclosure. However, one skilled in the art will understand that the disclosure may be practiced without these specific details. In other instances, well-known structures have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An irradiance sensing device, comprising:
a housing having an opening extending into the housing from an outer surface, the opening having a circular shape at the outer surface of the housing; and
an optical diffuser coupled to the housing, the optical diffuser having a first region that extends at least partially beyond the outer surface of the housing and a second region housed within the housing, the first region of the optical diffuser having a curved surface,
wherein the optical diffuser includes a cavity extending entirely through the second region and,
wherein an outer surface of the first region of the optical diffuser is larger in diameter than an outer surface of the second region of the optical diffuser.

2. The irradiance sensing device of claim 1, further comprising:
a photo sensor within the housing, wherein the cavity of the optical diffuser overlies the photo sensor,
wherein, in use, the optical diffuser is configured to receive light and to diffuse and transmit the received light to the photo sensor through the cavity.

3. The irradiance sensing device of claim 2, further comprising:
an optical filter disposed between the optical diffuser and the photo sensor.

4. The irradiance sensing device of claim 3 wherein the optical filter is at least one of a band-pass filter, a band-stop filter, a high-pass filter, or a low-pass filter.

5. The irradiance sensing device of claim 3, further comprising a fastening assembly configured to secure the optical diffuser and the optical filter within the opening in the housing.

6. The irradiance sensing device of claim 5 wherein the fastening assembly includes a washer and a lock ring positioned between the optical filter and the photo sensor.

7. The irradiance sensing device of claim 1 wherein the first region of the optical diffuser has a spherical shape, and the second region has a cylindrical shape.

8. The irradiance sensing device of claim 1 wherein an outer surface of the first region of the optical diffuser and an inner surface of the first region of the optical diffuser are concentric.

9. The irradiance sensing device of claim 1 wherein an outer surface of the second region of the optical diffuser and an inner surface of the second region of the optical diffuser are concentric.

10. The irradiance sensing device of claim 1 wherein the optical diffuser is formed of polytetrafluoroethylene (PTFE).

11. The irradiance sensing device of claim 1 wherein the optical diffuser has an outer diameter within a range from about 3 mm to about 7 mm, an inner diameter within a range from about 0.5 mm to about 4 mm, and a radial thickness within a range from about 0.5 mm to about 3 mm.

12. The irradiance sensing device of claim 11 wherein the outer diameter is substantially equal to 5 mm, the inner diameter is substantially equal to 2 mm, and the radial thickness is substantially equal to 1.5 mm.

13. An irradiance sensing device, comprising:
a printed circuit board;
a housing having an upper surface and a plurality of inclined surfaces that are inclined with respect to the upper surface, the plurality of inclined surfaces having different orientations with respect to one another, the plurality of inclined surfaces being transverse to the printed circuit board;
a plurality of first optical diffusers coupled to the printed circuit board and at least partially housed within the housing, each of the first optical diffusers having a first region including a curved surface extending outwardly at least partially beyond a respective first inclined surface of the plurality of inclined surfaces, the curved surface of the first region intersecting the first inclined surface along a plane that is transverse to the printed circuit board, and a second region housed within the housing,
wherein each of the first optical diffusers includes a cavity extending at least partially into the second region;
a plurality of photo sensors within the housing, wherein the cavity of each of the first optical diffusers overlies a respective one of the photo sensors;
a plurality of optical filters, each of the optical filters is between a respective one of the optical diffusers and a respective one of the photo sensors; and
a plurality of fastening assemblies each configured to secure one of the plurality of first optical diffusers and one of the plurality of optical filters, each fastening assembly including a washer and a lock ring positioned between the one of the plurality of optical filters and one of the plurality of photo sensors.

14. The irradiance sensing device of claim 13,
wherein, in use, the first optical diffusers are configured to receive light and to diffuse and transmit the received light to the respective photo sensor through the cavity.

15. The irradiance sensing device of claim 14, wherein each optical filter of the plurality of optical filters is at least one of a band-pass filter, a band-stop filter, a high-pass filter, or a low-pass filter.

16. The irradiance sensing device of claim 13 wherein the first region of each of the first optical diffusers has a spherical shape, and the second region has a cylindrical shape.

17. The irradiance sensing device of claim 13 wherein the optical diffusers are formed of polytetrafluoroethylene (PTFE).

18. The irradiance sensing device of claim 13, further comprising a second optical diffuser at least partially housed within the housing, the second optical diffuser having a first region including a curved surface extending outwardly at least partially beyond the upper surface of the housing, and a second region housed within the housing,
wherein the second optical diffuser has a size that is different than a size of the first optical diffusers.

19. The irradiance sensing device of claim 18, wherein the second optical diffuser has a cavity extending at least partially into the second region, and the second optical diffuser has a radial thickness that is greater than a radial thickness of the first optical diffusers.

20. The irradiance sensing device of claim 13 wherein the housing includes:
- a top enclosure including the upper surface and the plurality of inclined surfaces, and a plurality of irradiance sensing openings extending through the upper surface and the plurality of inclined surfaces,
- wherein the plurality of first optical diffusers are secured within the irradiance sensing openings.

21. A method, comprising:
- positioning an optical diffuser within an opening of a housing, the opening having a circular shape at an outer surface of the housing, the optical diffuser having a first region including a curved surface that extends at least partially beyond the outer surface of the housing, a second region disposed within the opening of the housing, and a cavity extending entirely through the second region,
- wherein an outer surface of the first region of the optical diffuser is larger in diameter than an outer surface of the second region of the optical diffuser;
- positioning an optical filter on the second region of the optical diffuser; and
- securing the optical filter and the optical diffuser in the opening of the housing.

22. The method of claim 21, wherein securing the optical filter and the optical diffuser in the opening of the housing includes securing the optical filter and the optical diffuser with a washer and a lock ring in the opening of the housing.

* * * * *